(12) United States Patent
Peterson et al.

(10) Patent No.: US 10,186,851 B2
(45) Date of Patent: Jan. 22, 2019

(54) CABLE-ASSEMBLY FOR ROBOTIC INSTALLATION

(71) Applicant: Aptiv Technologies Limited, St. Michael (BB)

(72) Inventors: David R. Peterson, Aurora, OH (US); Joseph Sudik, Jr., Niles, OH (US)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 15/634,291

(22) Filed: Jun. 27, 2017

(65) Prior Publication Data

US 2018/0375306 A1    Dec. 27, 2018

(51) Int. Cl.
*H02G 3/04* (2006.01)

(52) U.S. Cl.
CPC ................ *H02G 3/0456* (2013.01)

(58) Field of Classification Search
CPC .......... H02G 3/0456; H02G 3/00; H02G 3/02; H02G 3/04; H02G 3/0406; H02G 3/0437; H02G 7/00; H02G 7/02; H02G 3/32; F16L 3/00; F16L 3/006; F16L 3/02; F16L 3/06; F16L 3/08; F16L 3/12
USPC ......... 174/135, 40 CC, 40 R, 44, 43, 45 TD, 174/40 TD, 70 A, 42, 72 A; 248/74.1, 248/74.2, 65, 74.3, 49, 68.1
See application file for complete search history.

(56) References Cited

U.S. PATENT DOCUMENTS

| 3,889,909 | A | | 6/1975 | Koscik | |
|---|---|---|---|---|---|
| 5,354,021 | A | * | 10/1994 | Farrell | F16L 3/233 248/74.3 |
| 5,401,905 | A | * | 3/1995 | Lesser | H02G 3/26 174/68.3 |
| 5,700,156 | A | | 12/1997 | Bussard et al. | |
| 6,079,673 | A | * | 6/2000 | Cox | F16L 3/1041 174/40 R |
| 7,075,015 | B1 | * | 7/2006 | Rauckman | H02G 7/00 174/135 |
| 7,618,208 | B2 | | 11/2009 | Baines et al. | |
| 8,979,039 | B2 | * | 3/2015 | Shiga | H02G 3/32 174/40 CC |
| 8,991,774 | B2 | * | 3/2015 | Hajduch | H02G 3/32 248/220.22 |
| 9,512,940 | B2 | * | 12/2016 | Blakeley | H02G 3/32 |
| 2014/0069691 | A1 | | 3/2014 | Cox et al. | |

FOREIGN PATENT DOCUMENTS

| JP | 2009 055679 A | 3/2009 |
|---|---|---|
| WO | 2010/084343 A2 | 7/2010 |
| WO | 2016/190581 A1 | 12/2016 |

* cited by examiner

*Primary Examiner* — Angel R Estrada
(74) *Attorney, Agent, or Firm* — Robert J. Myers

(57) ABSTRACT

A cable-retaining-device is configured to use with a robotic actuator. The cable-retaining-device includes a generally cylindrically shaped body defining a longitudinal-axis. A mesial-portion of the body defines a passage configured to receive a cable extending longitudinally along an entire length of the body. A distal-portion of the body defines a slot extending radially about the longitudinal-axis. The cable-retaining-device also includes a cable-retaining-band disposed within the slot and radially encircling the cable-retaining-device.

11 Claims, 5 Drawing Sheets

CABLE-ASSEMBLY FOR ROBOTIC INSTALLATION

TECHNICAL FIELD OF INVENTION

This disclosure generally relates to a cable-retaining-device, and more particularly relates to a cable-retaining-device configured to use with a robotic actuator.

BACKGROUND OF INVENTION

It is known to retain electrical wiring using a clip that is attached to a substrate. The clip may be attached to a fastener, or the clip may have an integral fastening-device, such as a "fir tree" or a "rose bud", for example. The known retaining devices require a particular orientation about a longitudinal-axis of the electrical wiring to affix the clip to the substrate, making these devices challenging for an automated assembly process. Installing a wiring-harness into a vehicle is typically a labor intensive process. The typical mounting features attached to the wiring-harness benefit from the dexterity of a human hand, especially where a rotational alignment with a mounting hole or a mounting stud is required. These alignments are challenging for a robot to perform in the same amount of time as a human.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY OF THE INVENTION

In accordance with one embodiment, a cable-retaining-device, configured to use with a robotic actuator, is provided. The cable-retaining-device includes a generally cylindrically shaped body defining a longitudinal-axis. A mesial-portion of the body defines a passage configured to receive a cable extending longitudinally along an entire length of the body. A distal-portion of the body defines a slot extending radially about the longitudinal-axis. The cable-retaining-device also includes a cable-retaining-band disposed within the slot configured to radially encircle the cable-retaining-device.

The cable-retaining-band may be a cable-tie having a head and an elongate tail extending therefrom. The head is configured to receive a portion of the tail. The head may be integral to the body. The slot may extend from an exterior-surface of the body to the passage.

The body may include a plurality of ridges extending generally parallel to the longitudinal-axis along an exterior-surface of the body. The plurality of ridges may extend beyond the exterior-surface for a distance of at least 0.5 millimeters. Alternatively or additionally, the body may include a plurality of rectangular facets on an exterior-surface. A major axis of each rectangular facet is generally parallel to the longitudinal-axis.

The passage may be characterized as a U-shaped channel extending from the exterior-surface. Alternatively, the body may have a lower-shell, a first-upper-shell attached to the lower-shell by a first-hinge, and a second-upper-shell attached to the lower-shell by a second-hinge. The lower-shell defines a first-portion of the passage and both the first-upper-shell and the second-upper-shell define a second-portion of the passage. Both the first-upper-shell and the second-upper-shell may include locking-tabs that engage corresponding locking-ramps located on the lower-shell opposite both the first-hinge and the second-hinge.

The body may include a first-flange radially extending from a first-end of the body and a second-flange radially extending from a second-end of the body. The first-flange and the second-flange may extend beyond an exterior-surface of the body by a distance of at least 1.0 millimeter.

In another embodiment, a cable-assembly is provided. The cable-assembly includes a cable and a cable-retaining-device. The cable-retaining-device includes a generally cylindrically shaped body defining a longitudinal-axis. A mesial-portion of the body defines a passage configured to receive a cable extending longitudinally along an entire length of the body. A distal-portion of the body defines a slot extending radially about the longitudinal-axis. The cable-retaining-device also includes a cable-retaining-band disposed within the slot configured to radially encircle the cable-retaining-device. The cable is received within the passage.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

The reference numbers of similar elements in the embodiments shown in the various figures share the last two digits.

DETAILED DESCRIPTION

Described herein is a cable-retaining-device for use with a robotic installation process that does not require a unique rotational alignment. In addition, the cable-retaining-device may be readily targeted by a vision system that may accompany the robotic installation process, further improving the recognition of a particular branch of a wiring-harness for robotic installation.

Figure 1:
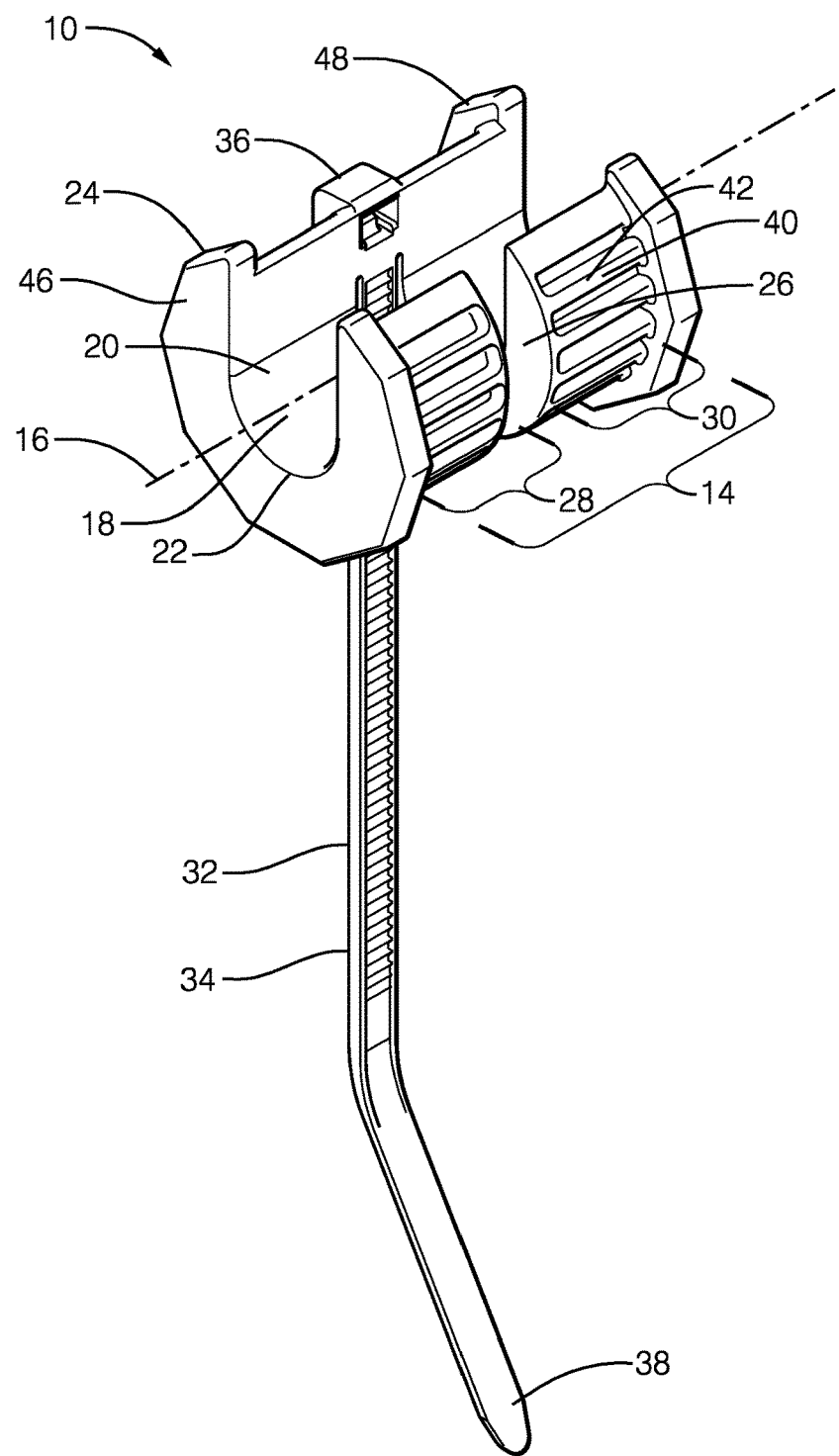
FIG. 1 is an illustration of a cable-retaining-device in accordance with one embodiment.

FIG. 1 illustrates a non-limiting example of a cable-retaining-device 10, hereafter referred to as a device 10, configured to use with a robotic actuator. As will be described in more detail below, the device 10 is an improvement over other cable-retaining-devices because it does not require a robotic actuator to orient the device 10 with a unique rotation about a cable 12 (see FIG. 3) to install a wire-harness (not shown) onto a vehicle (not shown). The device 10 includes a generally cylindrically shaped body 14 defining a longitudinal-axis 16. The body 14 may be composed of a polymeric material, such as a polyamide.

A mesial-portion 18 (i.e. central-portion, medial-portion, etc.) of the body 14 defines a passage 20 configured to receive the cable 12 extending longitudinally along an entire length of the body 14. The passage 20 may be characterized as a U-shaped 22 channel extending inwardly from the exterior-surface 42 to the mesial-portion 18. Other shapes of the channel are contemplated, but not shown, and include square, rectangular, and V-shaped. In the non-limiting example illustrated in FIG. 1, a radius (not shown) of the U-shaped 22 portion of the channel is 3.5 mm. The radius may be any radius required to receive the cable 12.

A distal-portion 24 of the body 14 defines a slot 26 extending radially about the longitudinal-axis 16 of the body 14. The slot 26 may preferably be centrally located between a first-end 28 of the body 14 and a second-end 30 of the body 14, or may be offset from the central location. The slot 26 is preferably open to the channel and terminates at a cable-retaining-band 32, as will be explained below.

The device 10 also includes the cable-retaining-band 32 disposed within the slot 26. The cable-retaining-band 32 is configured to radially encircle the device 10 to retain the cable 12. The cable-retaining-band 32 may be composed of a polymeric material similar to that of the body 14, and may be a cable-tie 34 having a head 36 and an elongate tail 38 extending from the head 36. The head 36 may be integral to the body 14 and is configured to receive a portion of the tail 38, wherein the tail 38 may be pulled through the head 36 such that the tail 38 is in forcible contact with the cable 12.

The body 14 may include a plurality of ridges 40 extending generally parallel to the longitudinal-axis 16 along an exterior-surface 42 of the body 14. The plurality of ridges 40 may preferably extend beyond the exterior-surface 42 for a distance of at least 0.5 millimeters (0.5 mm). In the non-limiting example illustrated in FIG. 1, the plurality of ridges 40 extend for a distance of 1.0 mm beyond the exterior-surface 42 and have a peak-to-peak spacing of 2.1 mm. The distance that the plurality of ridges 40 extend beyond the exterior-surface 42, and the spacing of the plurality of ridges 40, may be adjusted based on an attachment-mechanism 44A-44C (see FIGS. 5A-5C) used to retain the device 10.

The body 14 may include a first-flange 46 radially extending from the first-end 28 of the body 14 and a second-flange 48 radially extending from the second-end 30 of the body 14. Both the first-flange 46 and the second-flange 48 may extend beyond the exterior-surface 42 of the body 14 by a distance of at least 1.0 mm. The first-flange 46 and the second-flange 48 may have a generally disc-shaped profile or may have an angulated profile as illustrated in FIG. 1. The profile may be configured to assist in a targeting of a vision-system incorporated with the robotic actuator (not shown). In the non-limiting example illustrated in FIG. 1, both the first-flange 46 and the second-flange 48 extend beyond the plurality of ridges 40 by a distance of approximately 1.3 mm.

Figure 2:
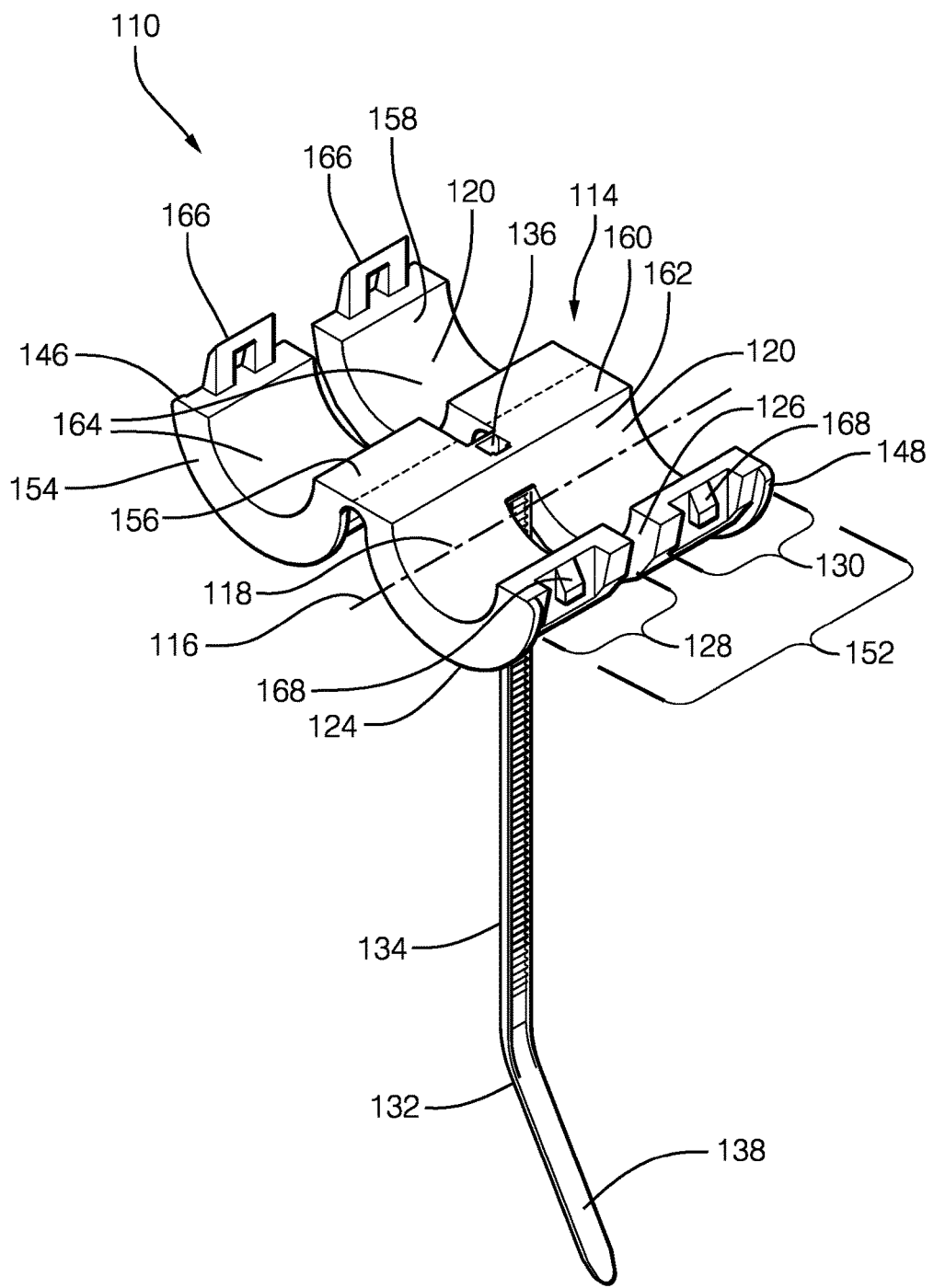
FIG. 2 is an illustration of a cable-retaining-device in accordance with another embodiment.

FIG. 2 illustrates a non-limiting example of another embodiment of a cable-retaining-device 110, hereafter referred to as the device 110. The device 110 includes a generally cylindrically shaped body 114 defining a longitudinal-axis 116. The body 114 may be composed of a polymeric material, such as a polyamide. The body 114 has a lower-shell 152, a first-upper-shell 154 attached to the lower-shell 152 by a first-hinge 156, and a second-upper-shell 158 attached to the lower-shell 152 by a second-hinge 160. The lower-shell 152 defines a first-portion 162 of a passage 120, and both the first-upper-shell 154 and the second-upper-shell 158 define a second-portion 164 of the passage 120. Both the first-upper-shell 154 and the second-upper-shell 158 include locking-tabs 166 that engage corresponding locking-ramps 168 located on the lower-shell 152 opposite both the first-hinge 156 and opposite the second-hinge 160. The device 110 is configured to encase a cable 112 when the locking-tabs 166 are locked to their corresponding locking-ramps 168, as illustrated in FIG. 4.

Returning to FIG. 2, a mesial-portion 118 (i.e. central-portion, medial-portion, etc.) of the body 114 defines a passage 120 configured to receive the cable 112 extending longitudinally along an entire length of the body 114. The passage 120 may be characterized as a cylindrical-shaped channel. Other shapes of the channel are contemplated, but not shown, and include square, rectangular, and triangular shapes. In the non-limiting example illustrated in FIG. 2, a radius of the channel is 3.5 mm. The radius may be any radius required to receive the cable 112.

A distal-portion 124 of the body 114 defines a slot 126 extending radially about the longitudinal-axis 116 of the body 114. The slot 126 extends from an exterior-surface 142 (see FIG. 4) of the body 114 to the passage 120. The slot 126 may preferably be centrally located between a first-end 128 of the body 114 and a second-end 130 of the body 114, or may be offset from the central location. The slot 126 is preferably open to the channel and terminates at a cable-retaining-band 132, as will be explained below.

The body 114 may include a plurality of rectangular facets 170 on the exterior-surface 142 (see FIG. 4). A major-axis (not specifically shown) of each rectangular facet 170 is generally parallel to the longitudinal-axis 116. In the non-limiting example illustrated in FIG. 4, the plurality of rectangular facets 170 each have a minor-axis (not specifically shown) dimension of 2.1 mm.

The device 110 also includes the cable-retaining-band 132 disposed within the slot 126. The cable-retaining-band 132 is configured to radially encircle the device 110 to retain the cable 112. The cable-retaining-band 132 may be composed of a polymeric material similar to that of the body 114, and may be a cable-tie 134 having a head 136 and an elongate tail 138 extending from the head 136. The head 136 may be integral to the body 114 and is configured to receive a portion of the tail 138, wherein the tail 138 may be pulled through the head 136 such that the tail 138 is in forcible contact with the cable 112.

Figure 3:
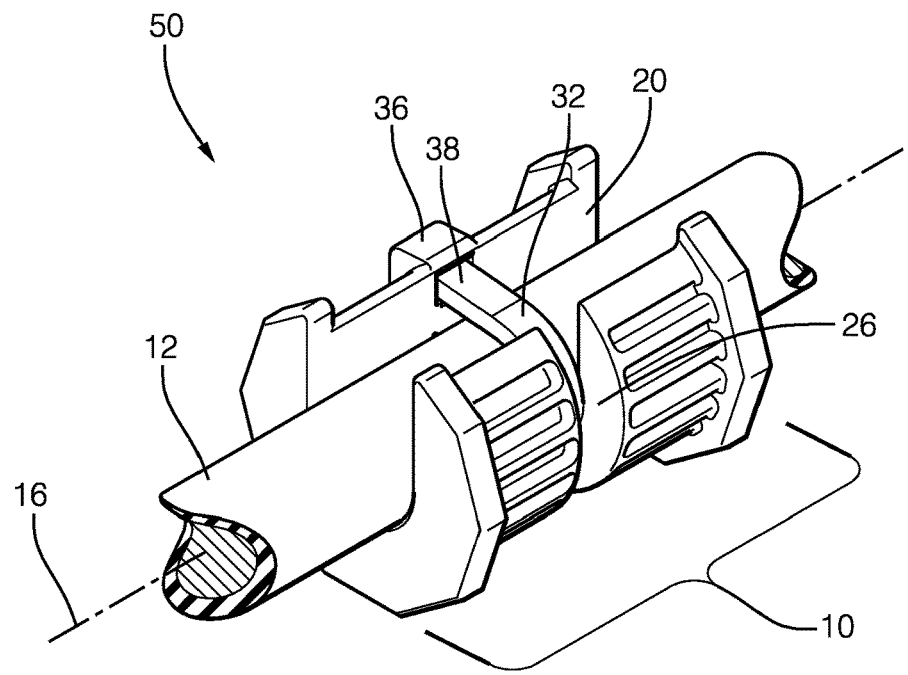
FIG. 3 is a perspective-view of an illustration of a cable-assembly with the cable-retaining-device of FIG. 1 in accordance with yet another embodiment.

FIG. 3 illustrates a non-limiting example of a cable-assembly 50, that includes the cable 12, and the device 10 described above. The cable 12 may be a solid wire, a multi-strand wire, or may be a multi-wire bundled cable 12. The cable 12 may include an insulation layer on an outer-surface (not specifically shown). The cable 12 may be any diameter that may be received within the passage 20. In the non-limiting example illustrated in FIG. 3, the cable-assembly 50 may accept the diameter of the cable 12 in a range from about 2.0 mm to about 7.0 mm. The cable 12 is received within the passage 20 and the cable-retaining-band 32 encircles the device 10 to retain the cable 12 when the tail 38 is pulled through the head 36 such that the tail 38 is in forcible contact with the cable 12. The cable-assembly 50 may be part of a larger wiring-harness that is installed in the vehicle, which may include a plurality of the devices 10 located at various points along the wiring-harness. A robotic actuator may handle the cable-assembly 50 and install the wiring-harness in the vehicle using attachment-mechanisms 44A-44C illustrated in FIGS. 5A-5C, respectively.

Figure 4A:
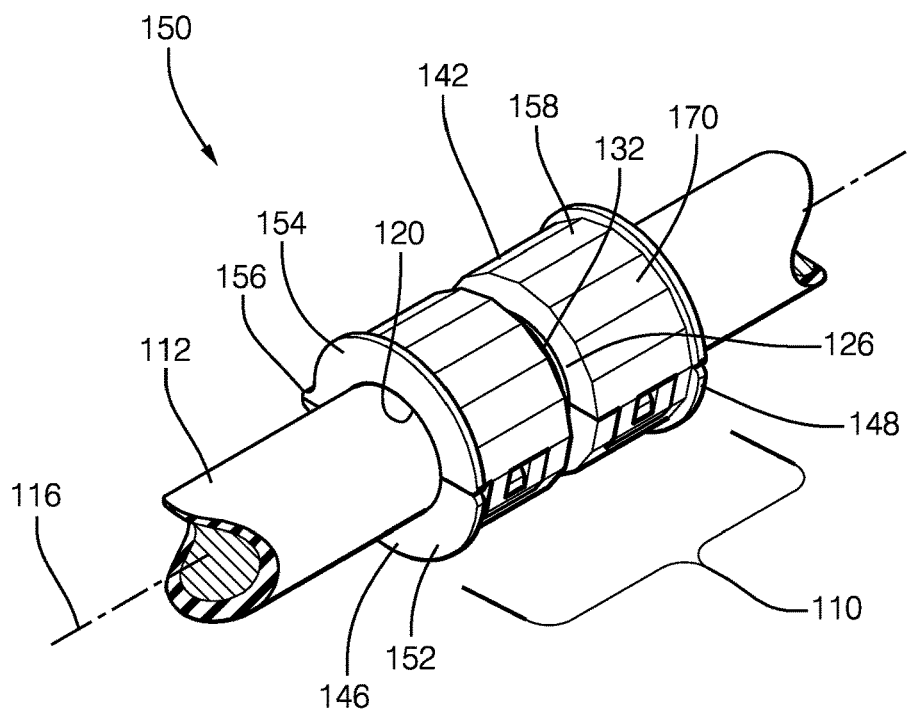
FIG. 4A is a perspective-view of an illustration of another cable-assembly with the cable-retaining-device of FIG. 2 in accordance with yet another embodiment.
Figure 4B:
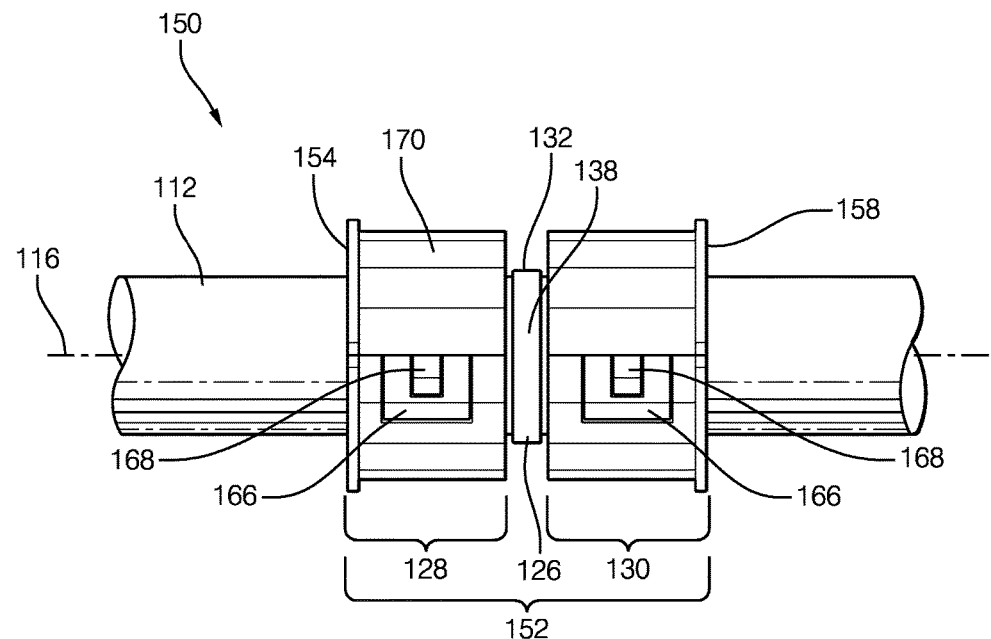
FIG. 4B is a front-view of an illustration of the cable-assembly of FIG. 4A in accordance with yet another embodiment.
Figure 4C:
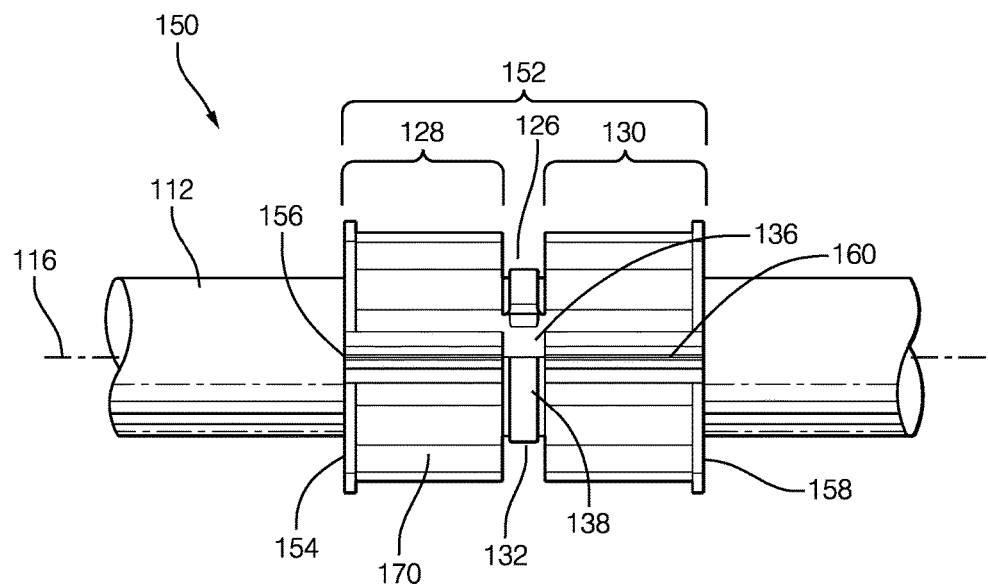
FIG. 4C is a rear-view of an illustration of the cable-assembly of FIG. 4A in accordance with yet another embodiment.

FIG. 4A illustrates a non-limiting example of another cable-assembly 150, that includes the cable 112, and the device 110 described above. The cable 112 may be a solid wire, a multi-strand wire, or may be a multi-wire bundled cable 112. The cable 112 may include an insulation layer on an outer-surface (not specifically shown). The cable 112 may be any diameter that may be received within the passage 120. In the non-limiting example illustrated in FIG. 4A, the cable-assembly 150 may accept the diameter of the cable 112 in a range from about 2.0 mm to about 7.0 mm. The cable 112 is received within the passage 120 and the cable-retaining-band 132 encircles the device 110 to retain the cable 112 when the tail 138 (see FIG. 4B front-view) is pulled through the head 136 (see FIG. 4C rear-view) such that the tail 138 is in forcible contact with the cable 112. The cable-assembly 150 may be part of a larger wiring-harness that is installed in the vehicle, which may include a plurality of the devices 110 located at various points along the wiring-harness. A robotic actuator may handle the cable-assembly 150 and install the wiring-harness in the vehicle using attachment-mechanisms 44A-44C illustrated in FIGS. 5A-5C, respectively.

Figure 5A:
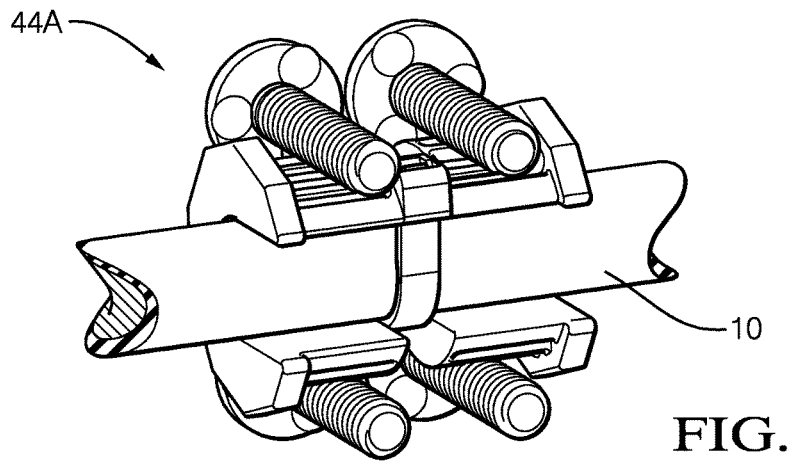
FIG. 5A is an illustration of an attachment-mechanism that retains the cable-assembly of FIG. 3 in accordance with one embodiment.
Figure 5B:
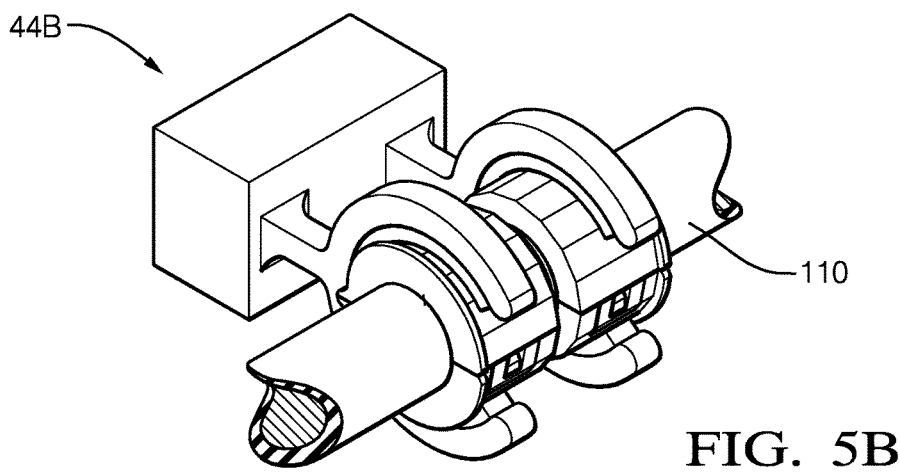
FIG. 5B is an illustration of another attachment-mechanism that retains the cable-assembly of FIG. 4A in accordance with another embodiment.
Figure 5C:
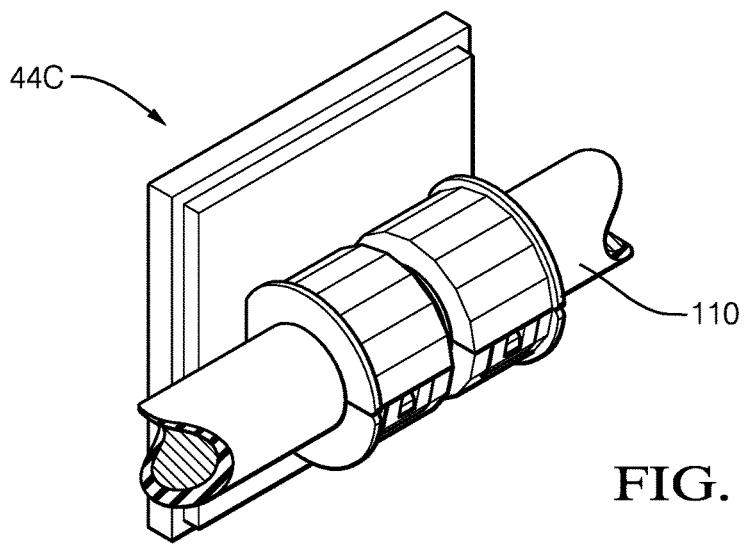
FIG. 5C is an illustration of yet another attachment-mechanism that retains the cable-assembly of FIG. 4A in accordance with yet another embodiment.

FIG. 5A-5C illustrate attachment-mechanisms 44A-44C, respectively. Attachment-mechanism 44A illustrates a threaded-post attachment that engages the plurality of ridges 40 of the device 10. Attachment-mechanism 44B illustrates a clip attachment that engages the plurality of rectangular facets 170 of the device 110. Attachment-mechanism 44C illustrates an adhesive attachment that engages a portion of the plurality of rectangular facets 170 of the device 110. Each of the attachment-mechanisms 44A-44C may be used with each of the cable-assemblies 50-150.

The examples presented herein are directed to electrical-cables. However, other embodiments of the cable-retaining-device 10 may be envisioned that are adapted for use with optical-cables or hybrid-cables including both electrical and optical-cables. Yet other embodiments of the cable-retaining-device 10, may be envisioned that are configured for installing pneumatic or hydraulic lines, or jacketed control-cables.

Accordingly, a cable-retaining-device 10 configured to use with a robotic actuator, and cable-assembly 50 is provided. The cable-retaining-device 10 is an improvement over other cable-retaining-devices because it does not require a robotic actuator to orient the device 10 with an unique rotation about the cable 12 to install the wire-harness onto the vehicle.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

We claim:

1. A cable-retaining-device configured to use with a robotic actuator, comprising:
   a generally cylindrically shaped body defining a longitudinal-axis, wherein a mesial-portion of the body defines a passage configured to receive a cable extending longitudinally along an entire length of the body, wherein a distal-portion of the body defines a slot extending radially about the longitudinal-axis; and
   a cable-retaining-band disposed within the slot configured to radially encircle the cable-retaining-device, wherein the cable-retaining-band is a cable-tie having a head and an elongate tail extending therefrom, said head configured to receive a portion of the tail, wherein the head is integral to the body.

2. The cable-retaining-device in accordance with claim 1, wherein the passage is characterized as a U-shaped channel extending from the exterior-surface.

3. The cable-retaining-device in accordance with claim 1, wherein the body includes a first-flange radially extending from a first-end of the body and a second-flange radially extending from a second-end of the body, wherein said first-flange and said second-flange extend beyond an exterior-surface of the body by a distance of at least 1.0 millimeters.

4. A cable-assembly, comprising:
   a cable; and
   the cable-retaining-device in accordance with claim 1, wherein the cable is received within the passage and wherein the cable-retaining-band encircles the cable-retaining-device.

5. A cable-retaining-device configured to use with a robotic actuator, comprising:
   a generally cylindrically shaped body defining a longitudinal-axis, wherein a mesial-portion of the body defines a passage configured to receive a cable extending longitudinally along an entire length of the body, wherein a distal-portion of the body defines a slot extending radially about the longitudinal-axis; and
   a cable-retaining-band disposed within the slot configured to radially encircle the cable-retaining-device, wherein the body includes a plurality of ridges extending generally parallel to the longitudinal-axis along an exterior-surface of the body.

6. The cable-retaining-device in accordance with claim 5, wherein the plurality of ridges extend beyond the exterior-surface for a distance of at least 0.5 millimeters.

7. A cable-retaining-device configured to use with a robotic actuator, comprising:
   a generally cylindrically shaped body defining a longitudinal-axis, wherein a mesial-portion of the body defines a passage configured to receive a cable extending longitudinally along an entire length of the body, wherein a distal-portion of the body defines a slot extending radially about the longitudinal-axis; and
   a cable-retaining-band disposed within the slot configured to radially encircle the cable-retaining-device, wherein the body has a lower-shell, a first-upper-shell attached to the lower-shell by a first-hinge, and a second-upper-shell attached to the lower-shell by a second-hinge, wherein the lower-shell defines a first-portion of the passage and both the first-upper-shell and the second-upper-shell define a second-portion of the passage.

8. The cable-retaining-device in accordance with claim 7, wherein the cable-retaining-band is a cable-tie having a head and an elongate tail extending therefrom, said head configured to receive a portion of the tail, wherein the head is integral to the body.

9. The cable-retaining-device in accordance with claim 7, wherein the slot extends from an exterior-surface of the body to the passage.

10. The cable-retaining-device in accordance with claim 7, wherein both the first-upper-shell and the second-upper-shell include locking-tabs that engage corresponding locking-ramps located on the lower-shell opposite both the first-hinge and the second-hinge.

11. A cable-retaining-device configured to use with a robotic actuator, comprising:
  a generally cylindrically shaped body defining a longitudinal-axis, wherein a mesial-portion of the body defines a passage configured to receive a cable extending longitudinally along an entire length of the body, wherein a distal-portion of the body defines a slot extending radially about the longitudinal-axis; and
  a cable-retaining-band disposed within the slot configured to radially encircle the cable-retaining-device, wherein the body includes a plurality of rectangular facets on an exterior-surface and wherein a major axis of each rectangular facet is generally parallel to the longitudinal-axis.

* * * * *